(12) United States Patent
Mitsui et al.

(10) Patent No.: US 8,236,070 B2
(45) Date of Patent: Aug. 7, 2012

(54) HEAT EXCHANGER, HEAT-EXCHANGE REFORMER, AND METHODS OF PRODUCING HEAT-EXCHANGER AND HEAT-EXCHANGE REFORMER

(75) Inventors: Hiroyuki Mitsui, Nagoya (JP); Takashi Shimazu, Nagoya (JP); Kenji Kimura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 884 days.

(21) Appl. No.: 12/298,365

(22) PCT Filed: Apr. 23, 2007

(86) PCT No.: PCT/IB2007/001049
§ 371 (c)(1),
(2), (4) Date: Oct. 24, 2008

(87) PCT Pub. No.: WO2007/122493
PCT Pub. Date: Nov. 1, 2007

(65) Prior Publication Data
US 2009/0173481 A1    Jul. 9, 2009

(30) Foreign Application Priority Data

Apr. 24, 2006   (JP) .................................. 2006-119750

(51) Int. Cl.
*F28F 3/00*   (2006.01)
(52) U.S. Cl. ........................................... 48/61; 165/166

(58) Field of Classification Search ........... 48/61–118.5, 48/127.1, 127.9, 197 R–197 A; 422/129–242; 429/400–535
See application file for complete search history.

(56) References Cited

U.S. PATENT DOCUMENTS

| | | | |
|---|---|---|---|
| 4,776,387 A | 10/1988 | Newman | |
| 4,805,695 A | 2/1989 | Ishikawa et al. | |
| 5,228,515 A * | 7/1993 | Tran ............................... | 165/166 |
| 2003/0049184 A1* | 3/2003 | Kimata et al. ................ | 422/188 |
| 2004/0206486 A1* | 10/2004 | Whittenberger .............. | 165/165 |

FOREIGN PATENT DOCUMENTS

| | | |
|---|---|---|
| EP | 0 639 258 | 2/1995 |
| JP | 2004 244230 | 9/2004 |
| WO | 95 30867 | 11/1995 |
| WO | 96 35083 | 11/1996 |

* cited by examiner

*Primary Examiner* — Imran Akram
(74) *Attorney, Agent, or Firm* — Oblon, Spivak, McClelland, Maier & Neustadt, L.L.P.

(57) ABSTRACT

A heat exchanger includes: a stacked core formed by stacking a plurality of unit plate members in each of which passage formation portions are formed independently of each other to extend from a heat-exchange passage formation portion along a plane; a case formed in accordance with the outer shape of the stacked core, and which houses the stacked core such that heat-exchange media flow into and flow out of the stacked core; and a join portion that serves as a sealing mechanism that supports the stacked core such that the stacked core does not contact the case, and that forms a heat-insulation layer between the case and the stacked core, wherein the heat-insulation layer is a closed space separated from the outside.

10 Claims, 9 Drawing Sheets

F I G . 2
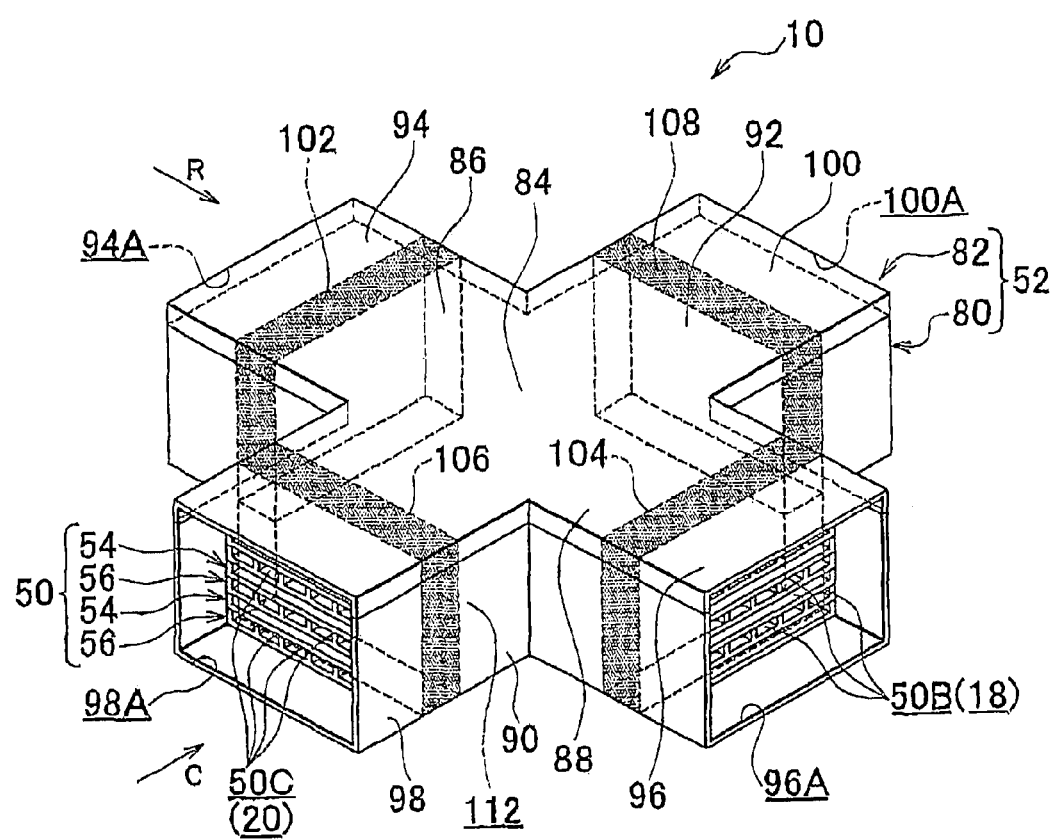

HEAT EXCHANGER, HEAT-EXCHANGE REFORMER, AND METHODS OF PRODUCING HEAT-EXCHANGER AND HEAT-EXCHANGE REFORMER

BACKGROUND OF THE INVENTION

1. Field of the Invention

The invention relates to a heat exchanger, a heat-exchange reformer in which the heat-exchanger is used, and which generates hydrogen by reforming a raw material, and methods of producing the heat exchanger and the heat-exchange reformer.

2. Description of the Related Art

A cross-flow fuel reformer is available. In the cross-flow fuel reformer, a plurality of plates are stacked. Each of reforming passages is formed between the plates, and each of heating passages is formed between the plates. The reforming passage and the heating passage are adjacent to each other via the plate. In the reforming passage, a hydrocarbon raw material is reformed to generate hydrogen-containing gas. In the heating passage, fuel gas is burned to supply heat to be used for a reforming reaction in the reforming passage. Such a fuel reformer is described, for example, in Japanese Patent Application Publication No. 2004-244230 (JP-A-2004-244230).

However, in the above-described fuel reformer, when manifolds are provided to distribute gas to the plurality of reforming passages and heating passages, and collect gas from the plurality of reforming passages and heating passages, rectangular-cylindrical manifold members are joined to end surfaces of the stacked plates. The uppermost plate, lowermost plate, and the like, to which the manifold members are joined, need to be thick. With this configuration, heat transmission passages, through which heat is transmitted from the thick plates to the manifold members, are formed. Part of heat generated in the heating passages is radiated via the heat transmission passages, and is not consumed in the reforming passages. This causes heat loss.

U.S. Pat. No. 4,776,387 A discloses a heat exchanger with a stacked core. The stacked core comprises channelized layers forming a first and a second heat-exchange passage. A case houses the stacked core such that a first heat-exchange medium and a second heat-exchange medium flow into and flow out of the stacked core by the heat-exchange passages. The core is fastened in the case by springs. In order to reduce the amount of heat that the springs are subjected to the first channelized layer next to each solid outer face of the core is sealed so that no gas passes through said layer. This, however, reduces the amount of heat exchange. Further, the channelized layer is provided only on the two solid faces of the core. The remaining four faces do not comprise a a heat-insulation layer. This causes heat loss on this faces.

SUMMARY OF THE INVENTION

The invention provides a heat exchanger and a heat-exchange reformer in which heat radiation to the outside from a stacked core formed by stacking a plurality of unit members is suppressed, and methods of producing the heat exchanger and the heat-exchange reformer.

A first aspect of the invention relates to a heat exchanger that includes a stacked core, a case, and layer formation sealing means. The stacked core is formed by stacking a plurality of unit members in each of which a first inlet passage formation portion, a first outlet passage formation portion, a second inlet passage formation portion, and a second outlet passage formation portion are formed independently of each other to extend from a heat-exchange passage formation portion along a plane. The stacked core includes a plurality of heat-exchange portions in each of which a first heat-exchange passage and a second heat-exchange passage are adjacent to each other via the heat-exchange passage formation portion. A first heat-exchange medium flows through the first heat-exchange passage from the first inlet passage formation portion to the first outlet passage formation portion. A second heat-exchange medium flows through the second heat-exchange passage from the second inlet passage formation portion to the second outlet passage formation portion. The case is formed in accordance with the outer shape of the stacked core, and houses the stacked core such that the first heat-exchange medium and the second heat-exchange medium flow into and flow out of the stacked core. The layer formation sealing means is provided between the inner surface of the case and the outer surface of the stacked core, and forms a heat-insulation layer between the case and the stacked core. The heat-insulation layer is a closed space separated from the outside.

According to the above-described aspect, the stacked core includes protrusion portions. That is, in the stacked core, a stacked portion formed by stacking the first inlet passage formation portions, a stacked portion formed by stacking the first outlet passage formation portions, a stacked portion formed by stacking the second inlet passage formation portions, and a stacked portion formed by stacking the second outlet passage formation portions protrude toward different sides (in different directions) from a stacked portion formed by stacking the heat-exchange passage formation portions (heat-exchange portions). The entire stacked core is housed in the case such that the first heat-exchange medium flows from the first inlet passage formation portion to the first outlet passage formation portion, and the second heat-exchange medium flows from the second inlet passage formation portion to the second outlet passage formation portion.

The heat-insulation layer is formed between the case and the stacked core. This increases resistance to heat transfer from the outer surface of the stacked core to the outside. Therefore, it is possible to suppress heat loss due to heat radiation from the stacked core. For example, when gas such as air is in the closed space, a convection flow of gas is suppressed in the space, particularly by making the closed space flat and narrow. Therefore, a high heat-insulation effect is obtained.

Thus, according to the above-described aspect, it is possible to suppress heat radiation to the outside from the stacked core formed by stacking a plurality of unit members. Also, for example, when the case that does not contact the stacked core is connected to pipes through which the first heat-exchange medium and the second heat-exchange medium flow into and out of the stacked core, it is possible to reduce the possibility that heat of the stacked core is transmitted through the pipes and radiated from the pipes.

In the above-described aspect, the layer formation sealing means may seal an area between the case and the entire periphery of a stacked portion, which is formed by stacking the first inlet passage formation portions in the stacked core, along a plane crossing a direction in which the first heat-exchange medium flows, and an area between the case and the entire periphery of a stacked portion, which is formed by stacking the first outlet passage formation portions in the stacked core, along the plane crossing the direction in which the first heat-exchange medium flows, and the layer formation sealing means may seal an area between the case and the entire periphery of a stacked portion, which is formed by stacking the second inlet passage formation portions in the stacked core, along a plane crossing a direction in which the second heat-exchange medium flows, and an area between the case and the entire periphery of a stacked portion, which is formed by stacking the second outlet passage formation portions in the stacked core, along the plane crossing the direction in which the second heat-exchange medium flows.

With this configuration, sealing is provided in an area between the inner surface of the case and the entire periphery of the outer surface of each of the protrusion portions that protrude in different directions from the stacked portion formed by stacking the heat-exchange passage formation portions (i.e., the stacked portion formed by stacking the first inlet passage formation portions, the stacked portion formed by stacking the first outlet passage formation portions, the stacked portion formed by stacking the second inlet passage formation portions, and the stacked portion formed by stacking the second outlet passage formation portions). Thus, the heat-insulation layer is formed to cover the entire stacked portion formed by stacking the heat-exchange passage formation portions (heat-exchange portions). Thus, a large area of the heat exchanger is heat-insulated by the heat-insulation layer. As a result, it is possible to effectively suppress heat loss due to heat radiation from the stacked core.

In the above-described aspect, the heat-insulation layer may be a vacuum layer.

With this configuration, resistance to heat transfer from the outer surface of the stacked core to the outside is further increased. Thus, it is possible to more effectively suppress heat loss due to heat radiation from the stacked core.

In the above-described aspect, the heat exchanger may further include partition sealing means which is provided between the inner surface of the case and the outer surface of the stacked core, and which partitions the heat-insulation layer into a plurality of closed spaces.

With this configuration, when the degree of vacuum, that is, heat transfer resistance decreases in one of chambers formed by partitioning the heat-insulation layer, and a convection flow (for example, the convection flow of air that enters the one of the chambers) occurs, the partition sealing means maintains a high degree of vacuum in the other chambers, and maintains a predetermined level of heat-insulation performance.

In the above-described aspect, each of the layer formation sealing means and the partition sealing means may be a join portion that mechanically joins the case to the stacked core.

With this configuration, each of the layer formation sealing means and the partition sealing means is formed by mechanically joining the stacked core to the case. In other words, mechanical strength and sealing performance are ensured by one structure. This simplifies the structure.

In the above-described aspect, at least a part of the join portion may be disposed to have a reinforcement function that suppresses heat deformation of the stacked core.

With this configuration, heat deformation of the stacked core that is supported such that the stacked core does not contact the case (i.e., heat deformation of the unit members that constitute the stacked core) is permitted in the case, and local concentration of stress is reduced. Further, because at least a part of the join portion has the reinforcement function (stiffening function), the stacked core is prevented from twisting or bending. The structure of the join portion that has the reinforcement function (for example, the position of the join portion) is set based on the distribution of low-temperature fluid and high-temperature fluid (including the difference in the temperature between the low-temperature fluid and high-temperature fluid), or the directions in which the low-temperature fluid and high-temperature fluid flow.

In the above-described aspect, manifold portions may be provided in portions of the case, which house a stacked portion formed by stacking the first inlet passage formation portions, a stacked portion formed by stacking the first outlet passage formation portions, a stacked portion formed by stacking the second inlet passage formation portions, and a stacked portion formed by stacking the second outlet passage formation portions in the stacked core, respectively. The manifold portions form spaces that are communicated with open portions of the first inlet passage formation portions, open portions of the first outlet passage formation portions, open portions of the second inlet passage formation portions, and open portions of the second outlet passage formation portions, respectively.

With this configuration, the manifold portions are formed by extending the portions of the case which house the protrusion portions (i.e., the stacked portion formed by stacking the first inlet passage formation portions, the stacked portion formed by stacking the first outlet passage formation portions, the stacked portion formed by stacking the second inlet passage formation portions, and the stacked portion formed by stacking the second outlet passage formation portions in the stacked core) toward a side opposite to the heat-exchange passage formation portion, or joining separate cylindrical members to the portions of the case which house the protrusion portions. The manifold portions protrude toward the side opposite to the heat-exchange passage formation portion. That is, the manifold portions are positioned farther from the heat-exchange passage formation portion than the open ends of the protrusion portions. Thus, it is possible to significantly suppress heat radiation via the manifolds, as compared to a configuration where the manifolds are directly joined to the stacked core. Particularly in the configuration where manifold portions are formed by joining the manifold members, which are separate members, to the case, it is possible to suppress heat transfer via join portions joined to the manifold members. This reduces the ratio of heat loss via the manifold to the entire heat loss.

A second aspect of the invention relates to a heat exchanger that includes a stacked core, a case, and sealing means. The stacked core is formed by stacking a first unit member that includes a first heat-exchange passage through which a first heat-exchange medium flows, and a second unit member that includes a second heat-exchange passage through which a second heat-exchange medium flows. The case is formed in accordance with the outer shape of the stacked core, and houses the stacked core such that the first heat-exchange medium and the second heat-exchange medium flow into and flow out of the stacked core. The sealing means is provided between the case and the stacked core, and forms a heat-insulation layer between the case and the stacked core. The heat-insulation layer is a closed space separated from the outside.

A third aspect of the invention relates to a heat-exchange reformer in which the heat exchanger according to the first aspect is used. More specifically, the first heat-exchange passage is a reforming passage in which a reforming reaction is caused to generate hydrogen-containing gas using a reforming raw material introduced through the first inlet passage formation portion. The second heat-exchange passage is a heating passage in which fuel supplied through the second inlet passage formation portion is burned to supply heat to the reforming passage so that the reforming reaction proceeds.

According to the above-described aspect, the reforming raw material is introduced into the reforming passage (first passage) through the first inlet passage formation portion, and the reforming reaction is caused to generate the hydrogen-containing gas using the reforming raw material in the reforming passage (first passage) while combustion heat generated by burning the fuel is supplied from the heating passage (second passage) to the reforming passage (first passage) (i.e., while heat is transferred from the heating passage to the reforming passage). Because the heat exchanger having each of the above-described structures is used in the heat-exchange reformer, it is possible to effectively reduce the possibility that heat generated in the heating portion is radiated, and is not consumed in the reforming portion, or the heat is radiated from the reforming portion to the outside. This improves the reforming efficiency of the heat-exchange reformer.

A fourth aspect of the invention relates to a method of producing a heat exchanger. The method includes forming a stacked core by stacking unit members each of which includes a heat-exchange passage through which a heat-exchange medium flows; forming sealing means on the outer wall of the stacked core; housing the stacked core with the formed sealing means in a case; heating the case to a temperature equal to or above a melting temperature at which the sealing means melts, under vacuum atmosphere; and cooling the case that has been heated.

A fifth aspect of the invention relates to a method of producing a heat-exchange reformer. The method includes forming a stacked core by alternately stacking a first unit member that includes a reforming passage in which a reforming reaction is caused to generate hydrogen-containing gas using a reforming raw material introduced into the reforming passage, and a second unit member that includes a heating passage in which fuel supplied to the heating passage is burned to supply heat to the reforming passage so that the reforming reaction proceeds, wherein the reforming passage and the heating passage cross each other; forming sealing means on the outer wall of the stacked core; housing the stacked core with the formed sealing means in a case; heating the case to a temperature equal to or above a melting temperature at which the sealing means melts, under vacuum atmosphere; and cooling the case that has been heated.

BRIEF DESCRIPTION OF THE DRAWINGS

The foregoing and/or further objects, features and advantages of the invention will become more apparent from the following description of example embodiment with reference to the accompanying drawings, in which like numerals are used to represent like elements and wherein:

FIG. 2 is a perspective view showing the entire configuration of the heat-exchange reformer according to the first embodiment of the invention;

DETAILED DESCRIPTION OF THE EXAMPLE EMBODIMENTS

In the following description, the present invention will be described in more detail in terms of example embodiments.

A heat-exchange reformer 10 according to a first embodiment of the invention will be described with reference FIG. 1 to FIG. 5. First, the entire configuration of a fuel cell system 11 in which the heat-exchange reformer 10 is employed will be described. Then, the structure of the heat-exchange reformer 10 will be described in detail.

Figure 5:
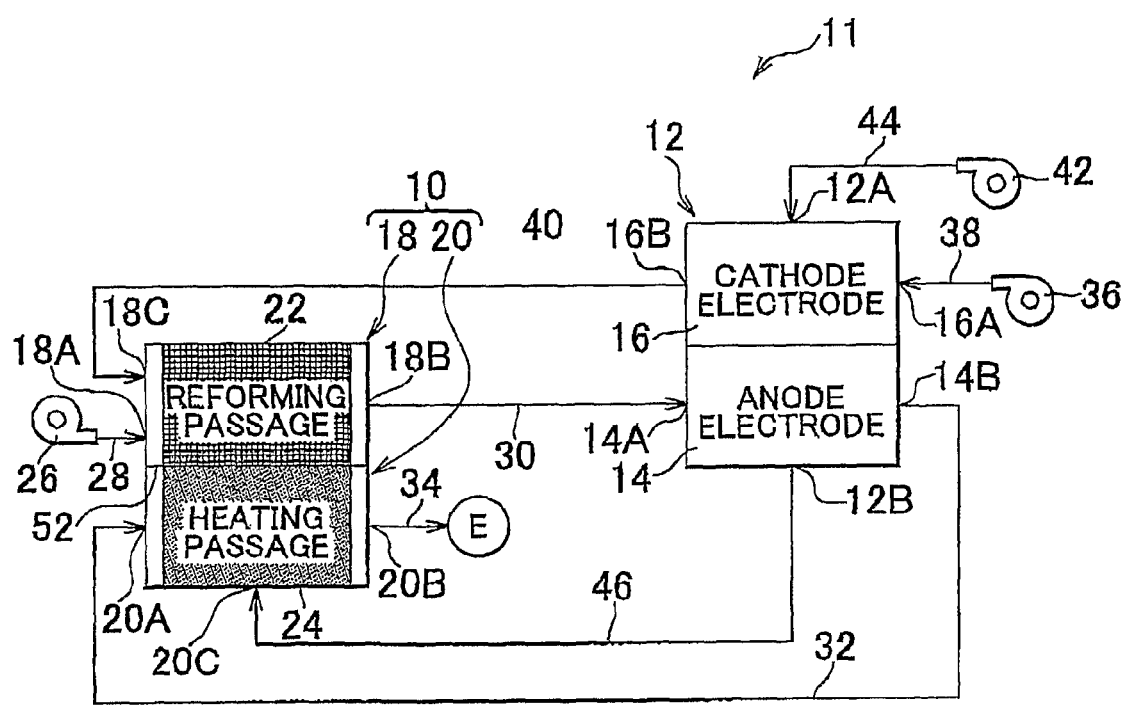
FIG. 5 is a schematic system flow diagram of a fuel cell system in which the heat-exchange reformer according to the first embodiment of the invention is used.

The entire configuration of the fuel cell system 11 will be described. FIG. 5 shows a configuration diagram (process flow-sheet) of the fuel cell system 11. As shown in FIG. 5, the fuel cell system 11 includes a fuel cell 12 and a reforming unit (reformer) 10. The fuel cell 12 and the reformer 10 are main elements of the fuel cell system 11. The fuel cell 12 consumes hydrogen and generates electric power The reformer 10 generates reformed gas to be supplied to the fuel cell 12. The reformed gas contains hydrogen.

In the fuel cell 12, an electrolyte (not shown) is provided between an anode electrode (fuel electrode) 14 and a cathode electrode (air electrode) 16. An electrochemical reaction is caused between hydrogen supplied mainly to the anode electrode, and oxygen supplied mainly to the cathode electrode 16, via the electrolyte. Thus, electric power is generated. As the fuel cell 12, various types of fuel cells may be employed. In this embodiment, the fuel cell 12 has a proton conducting electrolyte, and is operated in a medium temperature range (approximately 300° C. to 600° C.). In the fuel cell 12, water is generated in the cathode electrode 16 when electric power is generated. That is, as the fuel cell 12, for example, a proton-exchange membrane fuel cell or a hydrogen membrane fuel cell (HMFC) may be used.

As shown in FIG. 5, the heat-exchange reformer 10 includes a reforming passage 18, and a heating passage 20. The reforming passage 18 serves as a reforming portion that generates reformed gas to be supplied to the anode electrode 14 of the fuel cell 12. The reformed gas contains hydrogen. The heating passage 20 serves as a heating portion that supplies heat to be used for a reforming reaction in the reforming passage 18. A reforming catalyst 22 is supported in the reforming passage 18. A catalytic reaction is caused between hydrocarbon gas supplied to the reforming passage 18 (gasoline, methanol, natural gas, and the like), and gas used for reforming (steam). Thus, the reformed gas that contains hydrogen gas is generated (that is, a reforming reaction is caused).

The reforming reaction caused in the reforming passage 18 includes reactions represented by the following equations (1) to (4). The reformed gas obtained in such a reforming process contains flammable gas such as hydrogen ($H_2$), carbon monoxide (CO), methane ($CH_4$), and decomposed hydrocarbon or an unreacted hydrocarbon raw material ($C_xH_y$), and non-flammable gas such as carbon dioxide ($CO_2$) and water ($H_2O$).

$$C_nH_m + nH_2O \rightarrow nCO + (N+m/2)H_2 \tag{1}$$

$$C_nH_m + n/2 O_2 \rightarrow nCO + m/2 H_2 \tag{2}$$

$$CO + H_2O \leftrightharpoons CO_2 + H_2 \quad (3)$$

$$CO + 3H_2 \leftrightharpoons CH_4 + H_2O \quad (4)$$

The steam reforming reaction represented by the equation (1), which is the main reaction in the reforming reaction, is an endothermic reaction. Accordingly, the reforming passage 18 is operated at a temperature equal to or above a predetermined temperature to supply the reformed gas to the fuel cell 12 that is operated at a medium temperature or a high temperature as described above. Heat for maintaining the reforming reaction in the reforming passage 18, and for maintaining the operating temperature of the reforming passage 18 is supplied to the heating passage 20. The heating passage 20 is provided adjacent to the reforming passage 18. In the heating passage 20, an oxidation catalyst 24 is supported. Fuel supplied through the heating passage 20, and oxygen contact the oxidation catalyst 24, and thus catalytic combustion occurs.

In the heat-exchange reformer 10, combustion heat is obtained by causing the catalytic combustion using the fuel in the heating passage 20, and the obtained combustion heat is supplied to the reforming passage 18 via a plate portion 58 described below. Therefore, unlike a configuration in which the reforming passage 18 is heated using a heat medium (fluid) such as combustion gas, heat is directly supplied to the reforming passage 18.

The fuel cell system 11 includes a raw-material pump 26 that supplies a hydrocarbon raw material to the reforming passage 18. The discharge portion of the raw-material pump 26 is connected to the raw-material inlet 18A of the reforming passage 18 via a raw-material supply line 28. The hydrocarbon raw material in a gas phase or in the form of particulate matter is supplied to the reforming passage 18, for example, by vaporization means (not shown) such as an evaporator and an injector.

The reformed-gas outlet 18B of the reforming passage 18 is connected to the upstream end of a reformed-gas supply line 30. The downstream end of the reformed-gas supply line 30 is connected to the fuel inlet 14A of the anode electrode 14. The off-gas outlet 14B of the anode electrode 14 is connected to the upstream end of an anode off-gas line 32. The downstream end of the anode off-gas line 32 is connected to the fuel inlet 20A of the heating passage 20.

As described above, in the fuel cell system 11, the hydrogen contained in the reformed gas generated by the reforming passage 18 is consumed by the fuel cell 12. After the hydrogen is consumed and removed from the reformed gas, the remaining components of the reformed gas are introduced into the heating passage 20 as the anode off-gas. Among the remaining components, the flammable components (hydrogen ($H_2$), carbon monoxide (CO), hydrocarbon (HC), and methane ($CH_4$)) are consumed as the fuel in the heating passage 20. The exhaust-gas outlet 20B of the heating passage 20 is connected to an exhaust-gas line 34 through which combustion exhaust gas is discharged to the outside of the system.

The fuel cell system 11 further includes a cathode air pump 36 that supplies air to the cathode electrode 16. The discharge portion of the cathode air pump 36 is connected to the upstream end of a cathode air supply line 38. The downstream end of the cathode air supply line 38 is connected to the air inlet 16A of the cathode electrode 16. Further, the off-gas outlet 16B of the cathode electrode 16 is connected to the upstream end of a steam supply line 40. The downstream end of the steam supply line 40 is connected to the steam inlet 18C of the reforming passage 18. Thus, cathode off-gas is used for the steam reforming reaction in the reforming passage 18. The cathode off-gas contains the steam generated in the cathode electrode 16, and the oxygen that has not been consumed in the cathode electrode 16.

The fuel cell system 11 further includes a cooling air pump 42 that supplies air to the fuel cell 12 to cool the fuel cell 12. The discharge portion of the cooling air pump 42 is connected to the upstream end of a cooling air line 44. The downstream end of the cooling air line 44 is connected to the inlet 12A of a cooling-medium passage (not shown) of the fuel cell 12. The outlet 12B of the cooling medium passage is connected to the upstream end of a combustion-enhancing-gas supply line 46. The combustion-enhancing-gas supply line 46 is connected to the combustion-enhancing-gas inlet 20C of the heating passage 20. Cooling off-gas that contains oxygen is supplied to the heating passage 20 through the combustion-enhancing-gas supply line 46. The cooling off-gas that contains oxygen serves as combustion-enhancing gas. Thus, in the heating passage 20, the anode off-gas supplied through the anode off-gas line 32 and the cooling off-gas supplied through the combustion-enhancing-gas supply line 46 contact the oxidation catalyst 24 provided in the heating passage 20. As a result, catalytic combustion occurs.

Figure 1:
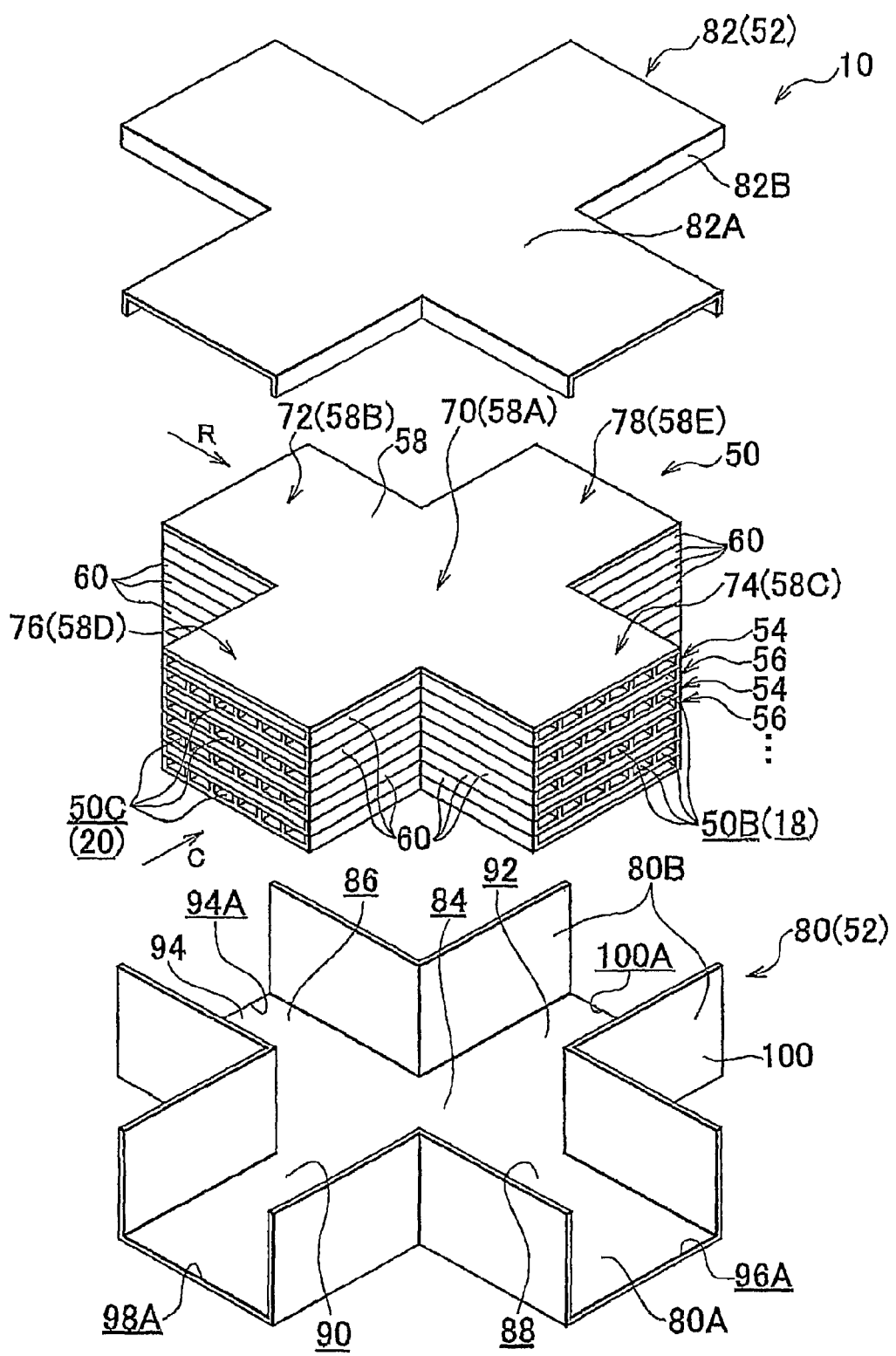
FIG. 1 is an exploded perspective view of a heat-exchange reformer according to a first embodiment of the invention.

The configuration of a heat-exchange reformer will be described. FIG. 2 is a perspective view showing the schematic entire configuration of the heat-exchange reformer 10. FIG. 1 is an exploded perspective view showing the schematic entire configuration of the heat-exchange reformer 10. As shown in FIG. 1 and FIG. 2, the heat-exchange reformer 10 includes a stacked core 50, and a case 52. The stacked core 50 and the case 52 are main elements of the heat-exchange reformer 10. In the stacked core 50, the reforming passages 18 and the heating passages 20 are formed. The stacked core 50 is housed in the case 52.

Figure 4A:
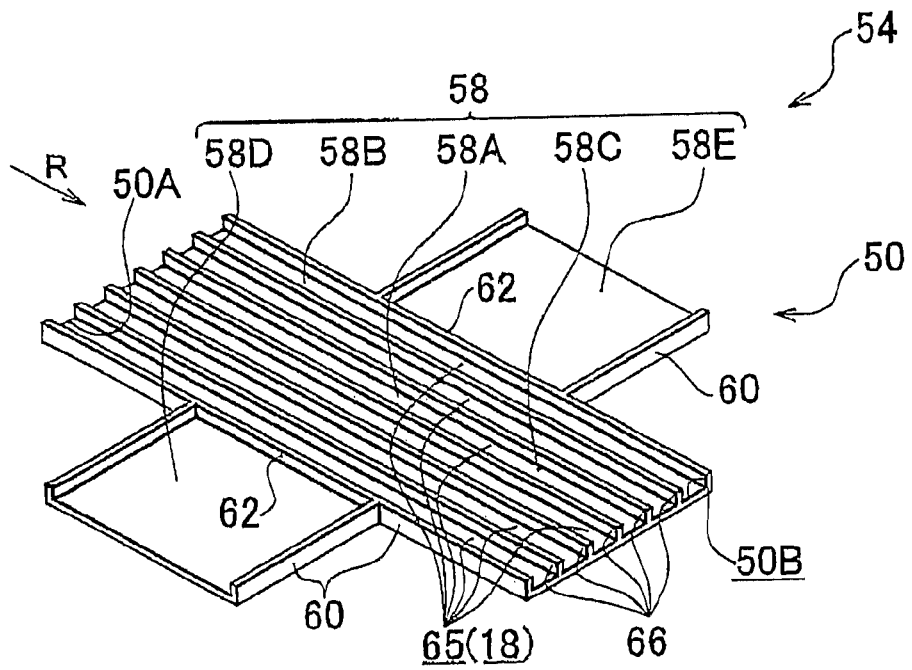
FIG. 4 is an exploded perspective view of a stacked core that constitutes the heat-exchange reformer according to the first embodiment of the invention.
Figure 4B:
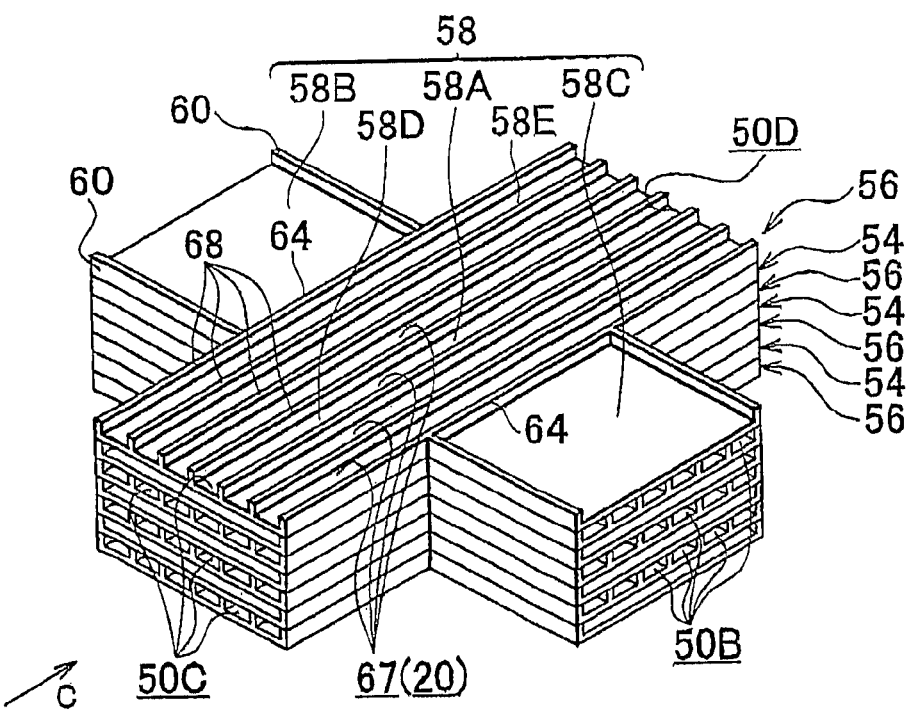

FIG. 4 is a partially exploded view of the stacked core 50. As shown in FIG. 4, in the stacked core 50, a plurality of unit plate members 54 and 56 are stacked. The unit plate members 54 and 56 serve as the unit members. Each reforming passage 18 is formed between the unit plate members 54 and 56, and each heating passage 20 is formed between the unit plate members 54 and 56. The reforming passage 18 and the heating passage 20 are formed independently of each other. The reforming passage 18 and the heating passage 20 are adjacent to each other via the plate portion 58 of the unit plate member 54 or 56. That is, the plate portion 58 serves as a partition wall between the reforming passage 18 and the heating passage 20. In this embodiment, the reforming passages 18 and the heating passages 20 are alternately disposed in the direction in which the unit plate members 54 and 56 are stacked (i.e., the direction of the thickness of the plate portions 58). The reforming passage 18 and the heating passage 20 are adjacent to each other via the plate portion 58. Hereinafter, the stacked core 50 will be described more specifically. In the following description, the arrow R indicates the direction in which gas flows in the reforming passage 18. The arrow C indicates the direction in which gas flows in the heating passage 20.

The plate portion 58 of each of the unit plate members 54 and 56 is a flat plate that has a substantially cross shape in a plan view. The plate portion 58 includes (i) a heat-exchange passage formation portion 58A which is a center portion (cross portion), and which has a square shape in the plan view; (ii) a raw-material inlet passage formation portion 58B that serves as the first inlet passage formation portion positioned upstream of the heat-exchange passage formation portion 58A in the direction indicated by the arrow R (hereinafter, referred to as "arrow-R direction") in each plate portion 58; (iii) a reformed-gas outlet passage formation portion 58C that serves as the first outlet passage formation portion positioned downstream of the heat-exchange passage formation portion 58A in the arrow-R direction; (iv) a fuel inlet passage formation portion 58D that serves as the second inlet passage formation portion positioned upstream of the heat-exchange passage formation portion 58A in the direction indicated by the arrow C (hereinafter, referred to as "arrow-C direction"); and (v) an exhaust-gas outlet passage formation portion 58E that serves as the second outlet passage formation portion positioned downstream of the heat-exchange passage formation portion 58A in the arrow-C direction.

Each of the unit plate members 54 and 56 includes outer walls 60 that stand along the entire periphery of the plate portion 58 excluding the upstream end and the downstream end in each of the arrow-R direction and the C-arrow direction. The outer walls 60 stand on the side where the reforming passage 18 and the heating passage 20 are formed. Further, each unit plate member 54 includes standing walls 62 that stand along a border portion between the fuel inlet passage formation portion 58D and the heat-exchange passage formation portion 58A, and along a border portion between the exhaust-gas outlet passage formation portion 58E and the heat-exchange passage formation portion 58A. The standing walls 62 are continuous with the outer walls 60. Each unit plate member 56 includes standing walls 64 that stand along a border portion between the raw-material inlet passage formation portion 58B and the heat-exchange passage formation portion 58A, and along a border portion between the reformed-gas outlet passage formation portion 58C and the heat-exchange passage formation portion 58A. The standing walls 64 are continuous with the outer walls 60.

Thus, in each unit plate member 54, the flat reforming passage 18 is formed on the side where the outer walls 60 and the standing walls 62 stand. In the reforming passage 18, the gas is permitted to flow only in the arrow-R direction (i.e., from the upstream side to the downstream side). In each unit plate member 56, the flat heating passage 20 is formed on the side where the outer walls 60 and the standing walls 62 stand. In the heating passage 20, the gas is permitted to flow only in the arrow-C direction (i.e., from the upstream side to the downstream side).

In this embodiment, an open end on the upstream side and an open end on the downstream side in the arrow-R direction in each reforming passage 18 formed between the unit plate members 54 and 56 are referred to as "reforming-side core inlet 50A" and "reforming-side core outlet 50B", respectively. An open end on the upstream side and an open end on the downstream side in the arrow-C direction in each heating passage 20 formed between the unit plate members 54 and 56 are referred to as "combustion-side core inlet 50C" and "combustion-side core outlet 50D", respectively. In addition to the standing walls 62 shown in FIG. 4, the standing wall(s) 62 may be provided also in the end portion or intermediate portion of at least one of the fuel inlet passage formation portion 58D and the exhaust-gas outlet passage formation portion 58E in the arrow-C direction. In addition to the standing walls 62 shown in FIG. 4, the standing wall(s) 64 may be provided in the end portion or intermediate portion of at least one of the raw-material inlet passage formation portion 58B and the reformed-gas outlet passage formation portion 58C in the arrow-R direction.

Each unit plate member 54 further includes a plurality of partition walls 66 that extend along the arrow-R direction. The partition walls 66 stand on the side where the outer walls 60 and the standing walls 62 stand. The height of the partition walls 66 is equal to the height of the outer walls 60 and the standing walls 62. Thus, each reforming passage 18 in the stacked core 50 is divided (partitioned) into a plurality of divided passages 65 that are parallel to each other. Similarly, each unit plate member 56 further includes a plurality of partition walls 68 that extend along the arrow-C direction. The partition walls 66 stand on the side where the outer walls 60 and the standing walls 64 stand. The height of the partition walls 68 is equal to the height of the outer walls 60 and the standing walls 64. Thus, each heating passage 20 in the stacked core 50 is divided (partitioned) into a plurality of divided passages 67 that are parallel to each other.

The above-described unit plate members 54 and 56 are formed into the same shape using metallic material such as stainless steel (and using a common die). The unit plate members 54 and 56 are oriented in different directions when the unit plate members 54 and 56 are stacked. Therefore, the unit plate members 54 and 56 have different functions.

As described above, the stacked core 50 is formed by alternately stacking and joining the unit plate members 54 and 56. Thus, in the stacked core 50, a cross-flow heat-exchange reforming portion is formed. That is, the direction in which the gas flows in the reforming passage 18 (i.e., the arrow-R direction) crosses the direction in which the gas flows in the heating passage 20 (i.e., the arrow-C direction) in the plan view. As shown in FIG. 1, in this embodiment, a flat plate portion 58 (cover), on which the outer walls 60 and the like are not provided, is disposed in the uppermost position of the stacked core 50. Thus, the flat plate portion 58 covers the reforming passage 18.

As shown in FIG. 1, the stacked core 50 includes (i) a heat-exchange reforming portion 70 formed by stacking the heat-exchange passage formation portions 58A; (ii) a reforming-side introduction passage portion 72 formed by stacking the raw-material inlet passage formation portions 58B each of which has the reforming-side core inlet 50A at the upstream end in the arrow-R direction; (iii) a reforming-side discharge passage 74 formed by stacking the reformed-gas outlet passage formation portions 58C each of which has the reforming-side core outlet 50B at the downstream end in the arrow-R direction; (iv) a reforming-side introduction passage portion 76 formed by stacking the fuel inlet passage formation portions 58D each of which has the combustion-side core inlet 50C at the upstream end in the arrow-C direction; and (v) a reforming-side discharge passage portion 78 formed by stacking the exhaust-gas outlet passage formation portions 58E each of which has the combustion-side core outlet 50D at the downstream end in the arrow-C direction. In each unit plate member 54, the reforming catalyst 22 is supported on the heat-exchange passage formation portion 58A that constitutes the heat-exchange reforming portion 70, the plurality of partition walls 66, and the paired standing walls 62. In each unit plate member 56, the oxidation catalyst 24 is supported on the heat-exchange passage formation portion 58A that constitutes the heat-exchange reforming portion 70, the plurality of partition walls 68, and the paired standing walls 64.

As shown in FIG. 1 and FIG. 2, the case 52 is formed to have a substantially cross shape in the plan view. The entire stacked core 50 is housed in the case 52. The case 52 includes a case body 80 and a cover 82. The stacked core 50 is housed mainly in the case body 80. The cover 82 covers the open end of the case body 80 (i.e., the open end of the stacked core 50 in the direction in which the unit plate members 54 and 56 are stacked). Hereinafter, the case 52 will be described more specifically.

The case body 80 includes a bottom plate 80A that has a shape in accordance with the shape of the plate portions 58 of the unit plate members 54 and 56; and side walls 80B that stand along the peripheral edge of the bottom plate 80A excluding the upstream end and downstream end in each of the arrow-R direction and arrow-C direction. The cover 82 includes a top plate 82A that has the substantially same shape as that of the bottom plate 80A; and side walls 82B that stand along the peripheral edge of the top plate 82A excluding the upstream end and downstream end in each of the arrow-R direction and the arrow-C direction. The ends of the side walls 80B and the ends of the side walls 82B are caused to contact each other, and are joined together by brazing, welding, or the like. Thus, the case 52 covers the entire stacked core 50.

Accordingly, (i) a heat-exchange portion housing portion 84, (ii) a reforming inlet manifold connection portion 86, (iii) a reforming outlet manifold connection portion 88, (iv) a combustion inlet manifold connection portion 90, and (v) a combustion outlet manifold connection portion 92 are integrally formed in the case 52. The heat-exchange portion housing portion 84 houses the heat-exchange reforming portion 70. The reforming inlet manifold connection portion 86 is the cylindrical body that houses the reforming-side introduction passage portion 72. The reforming outlet manifold connection portion 88 is the cylindrical body that houses the reforming-side discharge passage portion 74. The combustion inlet manifold connection portion 90 is the cylindrical body that houses the reforming-side introduction passage portion 76. The combustion outlet manifold connection portion 92 is the cylindrical body that houses the reforming-side discharge passage portion 78.

Also, (i) a reforming inlet manifold 94, (ii) a reforming outlet manifold 96, (iii) a combustion inlet manifold 98, and (iv) a combustion outlet manifold 100 are integrally formed in the case 52. The reforming inlet manifold 94 extends from the reforming inlet manifold connection portion 86, and forms a space upstream of the reforming-side core inlets 50A in the arrow-R direction so that the reforming-side core inlets 50A are communicated with each other. The reforming outlet manifold 96 extends from the reforming outlet manifold connection portion 88, and forms a space downstream of the reforming-side core outlets 50B in the arrow-R direction so that the reforming-side core outlets 50B are communicated with each other. The combustion inlet manifold 98 extends from the combustion inlet manifold connection portion 90, and forms a space upstream of the combustion-side core inlets 50C in the arrow-C direction so that the combustion-side core inlets 50C are communicated with each other. The combustion outlet manifold 100 extends from the combustion outlet manifold connection portion 92, and forms a space downstream of the combustion-side core outlets 50D in the arrow-C direction so that the combustion-side core outlets 50D are communicated with each other.

The raw-material inlet 18A and the steam inlet 18C are provided at (connected to) the open end 94A of the reforming inlet manifold 94. The reformed-gas outlet 18B is provided at the open end 96A of the reforming outlet manifold 96. The fuel inlets 20A and the combustion-enhancing gas inlet 20C are provided at the open end 98A of the combustion inlet manifold 98. The exhaust-gas outlet 20B is provided at the open end 100A of the combustion outlet manifold 100.

Both of the case body 80 and the cover 82 of the above-described case 52 are formed using metallic material such as stainless steel. The inner surface of the case 52 is joined to the stacked core 50. More specifically, as shown in FIG. 2, the case 52 is joined to the stacked core 50 by (i) a reforming inlet-side join portion 102; (ii) a reforming outlet-side join portion 104; (iii) a combustion inlet-side join portion 106; and (iv) a combustion outlet-side join portion 108. The reforming inlet-side join portion 102 joins the inner surface of the reforming inlet manifold connection portion 86 to the entire periphery of the reforming-side introduction passage portion 72 along a plane crossing the arrow-R direction. The reforming outlet-side join portion 104 joins the inner surface of the reforming outlet manifold connection portion 88 to the entire periphery of the reforming-side discharge passage portion 74 along a plane crossing the arrow-R direction. The combustion inlet-side join portion 106 joins the inner surface of the combustion inlet manifold connection portion 90 to the entire periphery of the reforming-side introduction passage portion 76 along a plane crossing the arrow-C direction. The combustion outlet-side join portion 108 joins the inner surface of the combustion outlet manifold connection portion 92 to the entire periphery of the reforming-side discharge passage portion 78 along a plane crossing the arrow-C direction.

Figure 3:
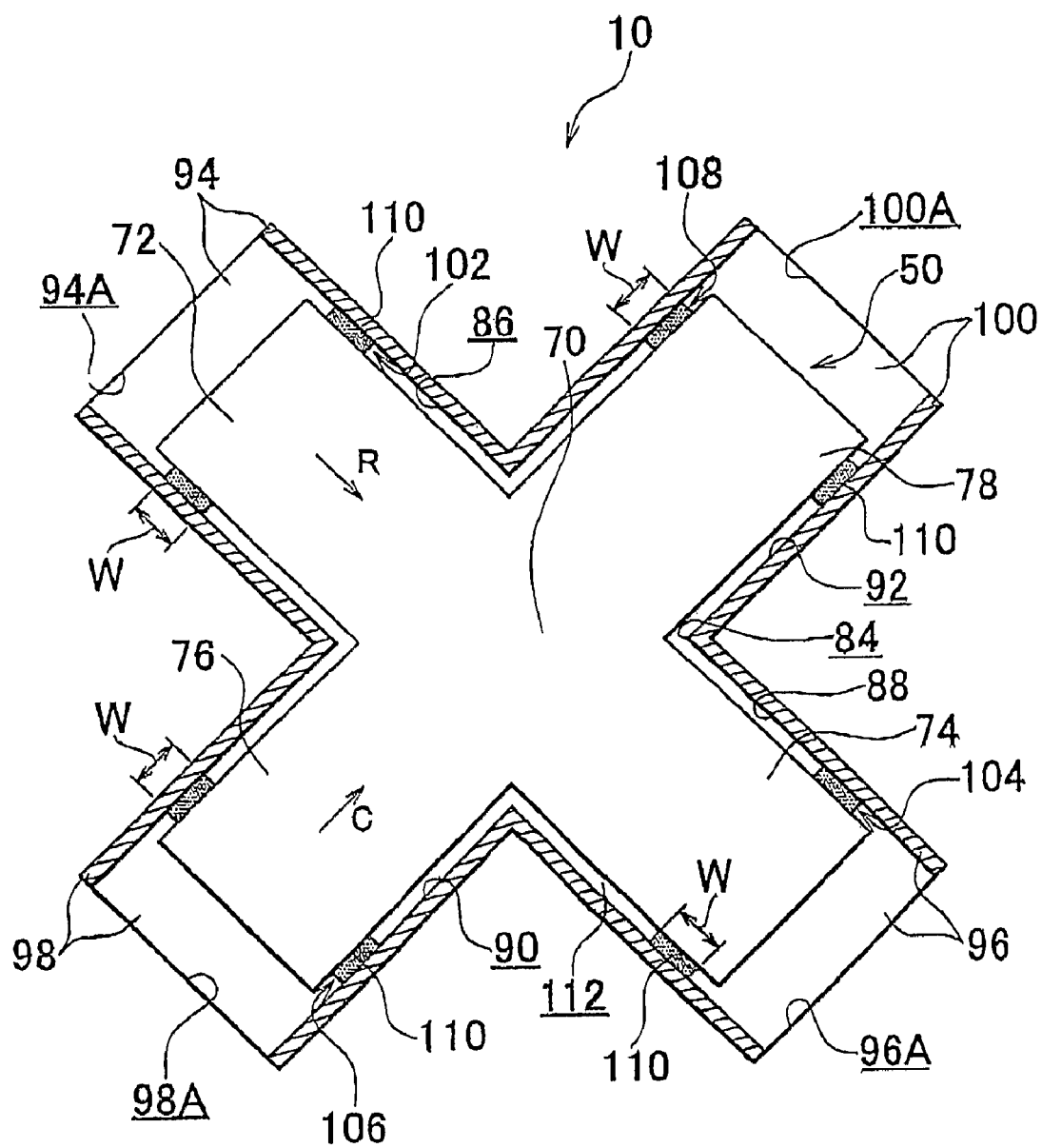
FIG. 3 is a plan sectional view of the heat-exchange reformer according to the first embodiment of the invention.

In this embodiment, each of the reforming inlet-side join portion 102, the reforming outlet-side join portion 104, the combustion inlet-side join portion 106, and the combustion outlet-side join portion 108 is formed to have a rectangular-annular shape, by melting and solidifying a brazing material 110 (refer to FIG. 3) provided (fitted) between the inner surface of the case 52 and the outer surface of the stacked core 50. Thus, as shown in FIG. 3, a heat-insulation layer 112 is formed between the stacked core 50 and the case 52. The heat-insulation layer 112 is a closed space (gap) sealed by the reforming inlet-side join portion 102, the reforming outlet-side join portion 104, the combustion inlet-side join portion 106, and the combustion outlet-side join portion 108 (the rectangular-annular-shaped brazing materials 110) in an airtight manner. In this embodiment, the reforming inlet-side join portion 102, the reforming outlet-side join portion 104, the combustion inlet-side join portion 106, and the combustion outlet-side join portion 108 are formed by vacuum brazing. Therefore, the heat-insulation layer 112 is a vacuum layer.

Accordingly, in this embodiment, the reforming inlet-side join portion 102, the reforming outlet-side join portion 104, the combustion inlet-side join portion 106, and the combustion outlet-side join portion 108 (and the rectangular-annular-shaped brazing materials 110 that constitute these join portions) may be regarded as the layer formation sealing means according to the invention. The join width W of each of the reforming inlet-side join portion 102, the reforming outlet-side join portion 104, the combustion inlet-side join portion 106, and the combustion outlet-side join portion 108 that join the outer surface of the stacked core 50 to the inner surface of the case 52 (i.e., the length of each join portion along the direction in which the gas flows) is sufficiently large with respect to the thickness of the heat-insulation layer 112 (i.e., the distance between the outer surface of the stacked core 50 and the inner surface of the case 52, which face each other). Thus, a sufficient level of gas sealing performance is ensured. The brazing material 110 has a lower melting point than that of a brazing material used in the stacked core 50 (i.e., the brazing material used to join the unit plate members 54 and 56).

Next, effects of the first embodiment will be described.

In the fuel cell system 11 having the above-described configuration, by operating the raw-material pump 26, the hydrocarbon raw material is introduced into the reforming passage 18 of the heat-exchange reformer 10 through the raw-material supply line 28. Also, by operating the cathode air pump 36, the steam (cathode off-gas) is introduced into the reforming passage 18 of the heat-exchange reformer 10. In the reforming passage 18 of the heat-exchange reformer 10, the hydrocarbon raw material, which is introduced into the reforming passage 18 while heat is supplied from the heating passage 20, and the steam contact the reforming catalyst 22. Thus, the reforming reaction indicated by the equations (1) to (4), which includes the steam reforming reaction, is caused. As a result, the reformed gas that contains a high concentration of hydrogen is generated.

As shown in FIG. 5, the reformed gas generated in the reforming passage 18 is supplied to the anode electrode 14 through the fuel inlet 14A of the anode electrode 14. In the fuel cell 12, the hydrogen molecules contained in the reformed gas supplied to the anode electrode 14 are converted into hydrogen ions (protons) and electrons. The protons move to the cathode electrode 16 via the electrolyte, and react with oxygen in the air introduced into the cathode electrode 16. When the protons move, the electrons flow from the anode electrode 14 to the cathode electrode 16 via an outer conductor. Thus, electric power is generated.

In the fuel cell 12, when the electric power is generated, the hydrogen contained in the reformed gas supplied to the anode electrode 14 and the oxygen contained in the air supplied to the cathode electrode 16 are consumed according to the amount of generated electric power (the amount of electric power consumed by a load), and water is generated (steam is generated at the operating temperature) in the cathode electrode 16. The gas containing the steam is pushed from the cathode electrode 16 to the steam supply line 40, as the cathode off-gas. Thus, the cathode off-gas is introduced into the reforming passage 18 through the steam inlet 18C, as described above.

After the hydrogen contained in the reformed gas is consumed according to the amount of generated electric power when the electric power is generated, the gas is discharged from the anode electrode 14, as the anode off-gas. The anode off-gas is supplied to the heating passage 20 of the heat-exchange reformer 10 via the anode off-gas line 32. After the fuel cell 12 is cooled, the cooling off-gas is supplied to the heating passage 20 through the combustion-enhancing-gas supply line 46. In the heating passage 20, both of the flammable components contained in the anode off-gas that is the fuel, and the oxygen contained in the cooling off-gas that is the combustion-enhancing gas contact the oxidation catalyst 24. Thus, the catalytic combustion occurs. The heat generated by the catalytic combustion is supplied to the reforming passage 18 via the plate portion 58. Using this heat, the reforming reaction, which is the endothermic reaction, is maintained in the reforming passage 18, and the operating temperature (i.e., the temperature of the reformed gas) is maintained at a temperature required for the reforming reaction.

As described above, in the fuel cell system 11, the hydrocarbon raw material is supplied to the heat-exchange reformer 10. In addition, the operation of the heat-exchange reformer 10 that generates hydrogen to be supplied to the fuel cell 12 is maintained, by effectively using the gases discharged from the fuel cell 12 (i.e., the cathode off-gas that contains the steam, the anode off-gas that contains the flammable components, and the cooling off-gas that contains oxygen).

When the heat-exchange reformer 10 is assembled, a plurality of unit plate members 54 and 56 are alternately stacked such that the direction in which the gas flows in the unit plate member 54 crosses the direction in which the gas flows in the unit plate member 56 (i.e., the longitudinal direction of the partition walls 66 crosses the longitudinal direction of the partition walls 68). Then, the ends of the outer walls 60 (and the ends of the standing walls 62 or 64, and the partition walls 66 or 68) are joined to the adjacent plate portion 58 by brazing. That is, each reforming passage 18 and each heating passages 20 is covered by the plate portion 58. Thus, the stacked core 50 is assembled. The brazing is performed using the brazing material that has a relatively high melting point (i.e., the brazing material that has a higher melting point than the operating temperature of the heat-exchange reformer 10). In the stacked core 50, the reforming catalyst 22 is supported by a catalyst carrier provided in the reforming passage 18 composed of the plurality of divided passages 65, and the oxidation catalyst 24 is supported by a catalyst carrier provided in the heating passage 20 composed of the plurality of divided passages 67.

Next, the rectangular-annular-shaped brazing material 110 is provided in each of the reforming-side introduction passage portion 72, the reforming-side discharge passage portion 74, the reforming-side introduction passage portion 76, and the reforming-side discharge passage portion 78 of the stacked core 50. In this situation, the stacked core 50 is inserted into the case body 80. Further, the cover 82 is joined to the case body 80. Thus, the case 52 that houses the stacked core 50 is formed. The case 52 that houses the stacked core 50 is heated in a vacuum fusion furnace to melt the brazing materials 110. Then, the case 52 that houses the stacked core 50 is cooled to solidify the brazing materials 110. Thus, the heat-exchange reformer 10 is obtained. In the heat-exchange reformer 10, the stacked core 50 is joined to the case 52 by the four join portions 102, 104, 106, and 108, and the vacuum heat-insulation layer 112 is formed between the stacked core 50 and the case 52.

Because the heat-insulation layer 112 is formed between the stacked core 50 and the case 52 in the heat-exchange reformer 10, it is possible to suppress heat radiation from the stacked core 50 to the outside. Hereinafter, the heat-exchange reformer 10 will be described more specifically in comparison with a heat-exchange reformer in a comparative example shown in FIG. 9.

Figure 9:
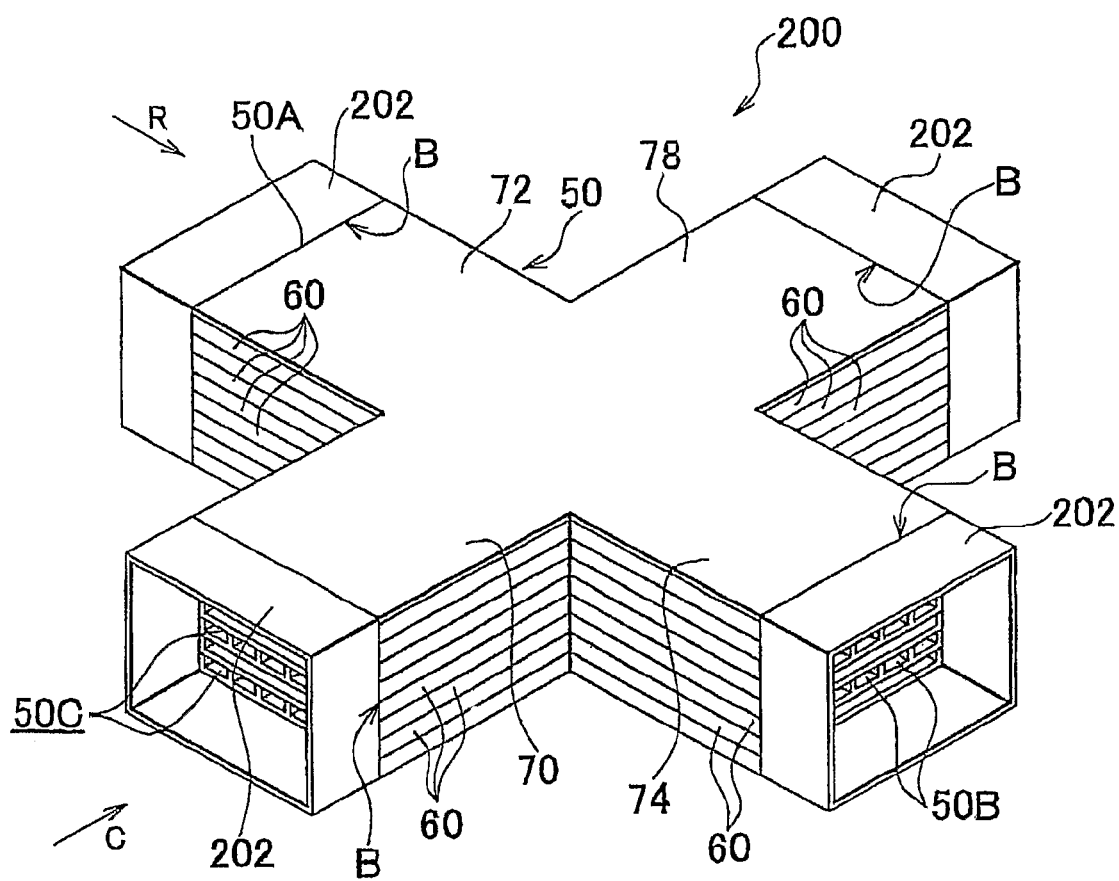
FIG. 9 is a perspective view of a heat-exchange reformer according to a comparative example that is compared with the embodiments of the invention.

In the heat-exchange reformer 200 in the comparative example shown in FIG. 9, one open end of a manifold member 202 that has a rectangular-cylindrical shape contacts the open end surfaces of the reforming-side core inlets 50A in the reforming-side introduction passage portion 72 of the stacked core 50 in a contact portion B. The manifold member 202 is joined to the reforming-side introduction passage portion 72 in the contact portion B by brazing. With this configuration, the stacked core 50 is exposed to the outside. Therefore, heat is directly radiated from the outer surface of the stacked core 50. Further, in this heat-exchange reformer 200, the plate portions 58 in the uppermost position and the lowermost position and the outer walls 60, to which the manifold members 202 are joined, need to be thick. Therefore, part of the heat transferred and input to the thick plate portions 58 and the thick outer walls 60 is moved toward the manifold members 202 along the direction of the surfaces of the plate portions 58 and the outer walls 60 (i.e., the direction in which the gas flows, or the direction opposite to the direction in which the gas flows), and radiated from the wall surfaces of the manifold members 202 to the outside. Thus, the part of the heat is lost. Further, a large amount of heat is lost due to heat conduction to pipes connected to the manifold members 202, and elements upstream and downstream of the heat-exchange reformer 200 (for example, the fuel cell 12), in addition to the heat loss due to the radiation from the manifold members 202. Because of the heat loss, a reforming conversion ratio may decrease due to a decrease in reforming efficiency (energy efficiency) and a decrease in the temperature (cooling) of each reforming passage 18 near the outer surface of the stacked core 50.

In contrast, in the heat-exchange reformer 10, the heat-insulation layer 112 is formed between the stacked core 50 and the case 52, as described above. Therefore, resistance to heat transfer from the stacked core 50 to the outside of the case 52 is large. Thus, it is possible to significantly suppress direct heat radiation from the stacked core 50 to the outside. Further, because the heat-insulation layer 112 is a vacuum layer, the resistance to heat transfer from the stacked core 50 to the outside of the case 52 is further increased. Thus, it is possible to more effectively suppress the direct heat radiation from the stacked core 50 to the outside.

Also, in the heat-exchange reformer 10, the case 52 provided with the reforming inlet manifold 94, the reforming outlet manifold 96, the combustion inlet manifold 98, and the combustion outlet manifold 100 does not contact the stacked core 50. This shortens heat transfer passages through which the heat is transferred from the stacked core 50 to the case 52 via the join portions 102, 104, 106, and 108. As a result, it is possible to reduce the heat loss due to heat conduction from the stacked core 50 via the case 52. Further, it is possible to suppress heat transfer to the pipes connected to the manifolds 94, 96, 98, 100, and to the elements upstream and downstream of the heat-exchange reformer 10 (for example, the elements of the fuel cell system 11).

Further, in the heat-exchange reformer 10, the heat-insulation layer 112 is sealed by the brazing materials 110 provided in the passage portions 72, 74, 76, and 78. Therefore, a large area of the stacked core 50 is heat-insulated by the heat-insulation layer 112.

In the heat-exchange reformer 10 according to the embodiment, the join portions 102, 104, 106, and 108 function as the sealing means, thereby sealing the heat-insulation layer 112. Therefore, it is not necessary to separately provide a portion that mechanically connects the stacked core 50 to the case 52 (i.e., a portion that maintains strength), and a sealing portion. This simplifies the structure of the heat-exchange reformer 10. Also, in the heat-exchange reformer 10, because the outer surface of the stacked core 50 is joined to the inner surface of the case 52, a predetermined level of gas sealing performance is ensured by the sufficiently large join width W. Thus, it is possible to maintain a high degree of vacuum in the heat-insulation layer 112 for a long time. Also, with this configuration, the level of gas sealing performance between the stacked core 50 and the manifolds 94, 96, 98, and 100 is increased, as compared to the above-described comparative example in which the manifold members 202 are joined to the end surfaces of the passage portions. Also, in the heat-exchange reformer 10, a gas leak is appropriately suppressed.

Thus, in the heat-exchange reformer 10 according to the first embodiment, it is possible to suppress heat radiation from the stacked core 50 formed by stacking the plurality of unit plate members 54 and 56, to the outside.

Also, unlike the heat-exchange reformer 200, the manifold members 202 having the rectangular-cylindrical shape are not joined to the stacked core 50 in the heat-exchange reformer 10. Therefore, the plate portion 58 of each of the unit plate members 54 and 56, and each outer wall 60 can be made thin. Thus, it is possible to reduce the heat capacity of the stacked core 50, thus contributing to improvement of startability of the heat-exchange reformer 10.

In the heat-exchange reformer 10 according to the embodiment, the stacked core 50 is supported by the brazing materials 110 such that the stacked core 50 does not contact the case 52. Therefore, deformation of the stacked core 50 is permitted in the case 52, and concentration of stress is suppressed.

A second embodiment of the invention will be described. The same or corresponding components and parts as in the first embodiment are basically denoted by the same reference numerals, and the description and illustration thereof may be omitted.

Figure 6:
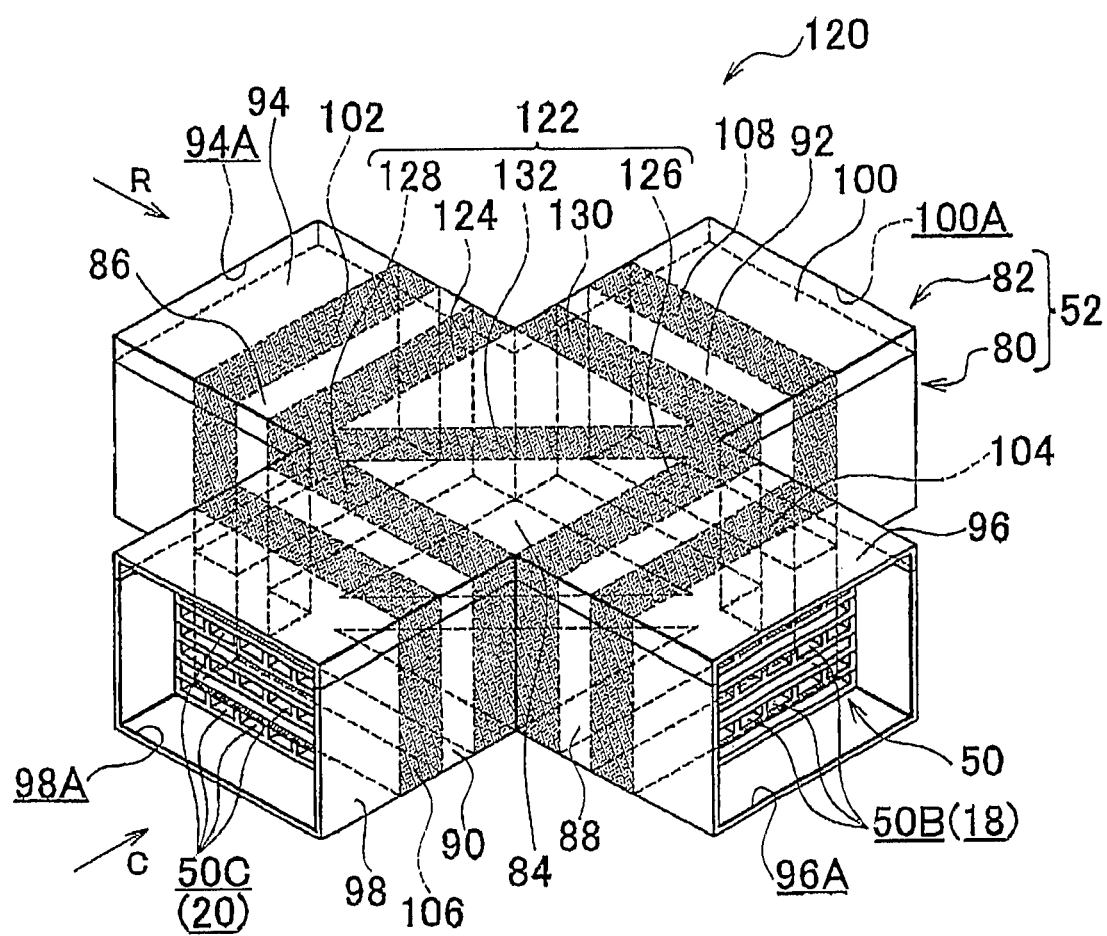
FIG. 6 is a perspective view showing the entire configuration of a heat-exchange reformer according to a second embodiment of the invention.

FIG. 6 shows a heat-exchange reformer 120 in the second embodiment of the invention. As shown in FIG. 6, the heat-exchange reformer 120 differs from the heat-exchange reformer 10 according to the first embodiment, in that partition join portion 122 is formed. The partition join portion 122 serves as partition sealing means for joining the stacked core 50 to the case 52 such that the heat-insulation layer 112 is partitioned into a plurality of spaces.

In this embodiment, the partition join portion 122 includes (i) a reforming inlet-side partition join portion 124; (ii) a reforming outlet-side partition join portion 126; (iii) a combustion inlet-side partition join portion 128; and (iv) a combustion outlet-side partition join portion 130. The reforming inlet-side partition join portion 124 is formed downstream of the reforming inlet-side join portion 102 in the arrow-R direction to join the inner surface of the reforming inlet manifold connection portion 86 to the entire outer periphery of the reforming-side introduction passage portion 72. The reforming outlet-side partition join portion 126 is formed upstream of the reforming outlet-side join portion 104 in the arrow-R direction to join the inner surface of the reforming outlet manifold connection portion 88 to the entire outer periphery of the reforming-side discharge passage portion 74. The combustion inlet-side partition join portion 128 is formed downstream of the combustion inlet-side join portion 106 in the arrow-C direction to join the inner surface of the combustion inlet manifold connection portion 90 to the entire outer periphery of the reforming-side introduction passage portion 76. The combustion outlet-side partition join portion 130 is formed upstream of the combustion outlet-side join portion 108 in the arrow-C direction to join the inner surface of the combustion outlet manifold connection portion 92 to the entire outer periphery of the reforming-side discharge passage portion 78.

Figure 7:
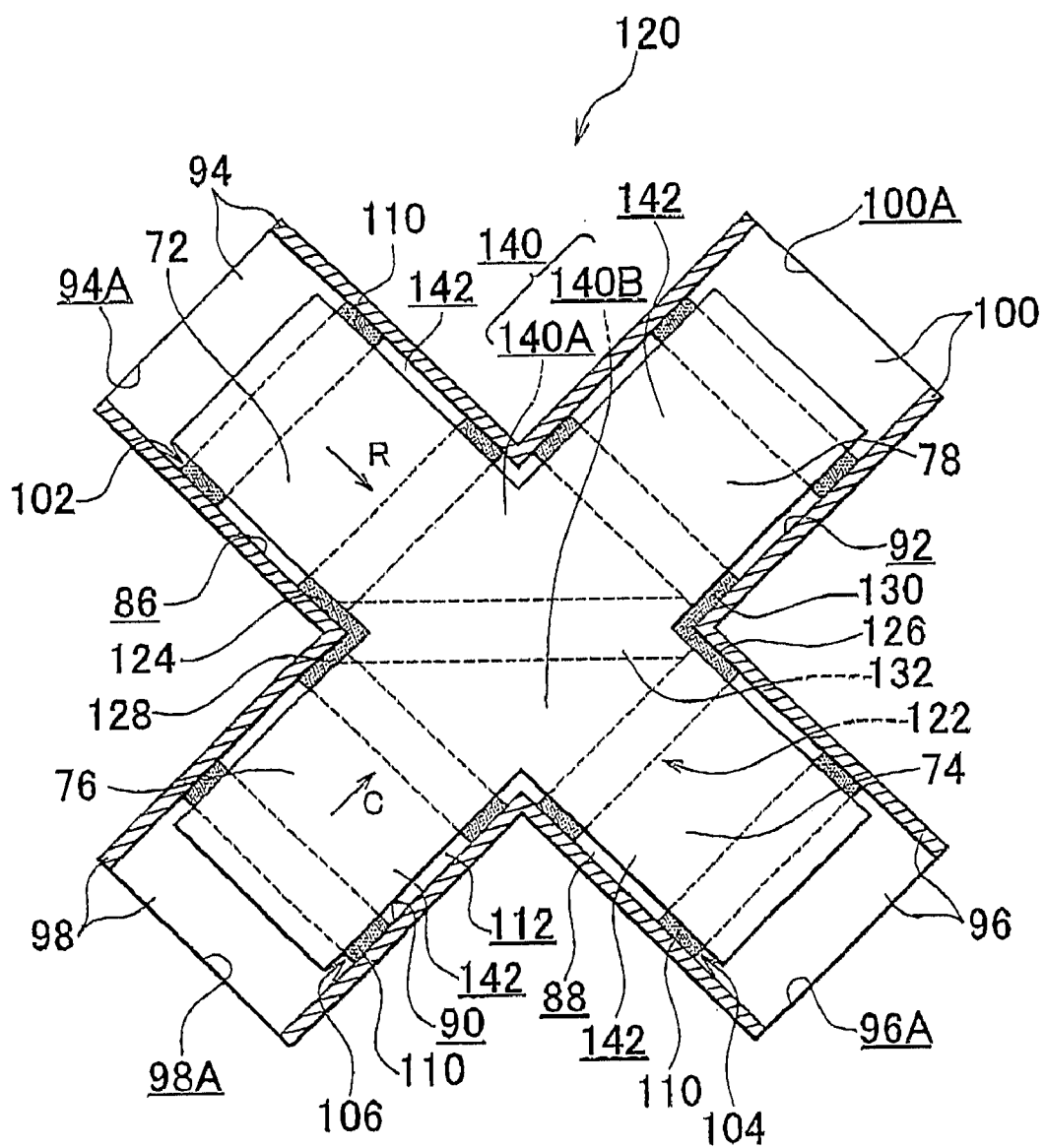
FIG. 7 is a plan sectional view of the heat-exchange reformer according to the second embodiment of the invention.

Thus, as shown in FIG. 7, the heat-insulation layer 112 is partitioned into an inner heat-insulation layer 140 sealed by the partition join portions 124, 126, 128, and 130; and four outer heat-insulation layers 142 positioned outside the inner heat-insulation layer 140. In this embodiment, the partition join portion 122 further includes a diagonal partition join portion 132. The diagonal partition join portion 132 extends from an upper corner between the reforming-side introduction passage portion 72 and the reforming-side introduction passage portion 76 to an upper corner between the reforming-side discharge passage portion 74 and the reforming-side discharge passage portion 78 along an orthogonal line. The diagonal partition join portion 132 also extends from a lower corner between the reforming-side introduction passage portion 72 and the reforming-side introduction passage portion 76 to a lower corner between the reforming-side discharge passage portion 74 and the reforming-side discharge passage portion 78 along an orthogonal line. The diagonal partition join portion 132 also extends from the upper corner between the reforming-side introduction passage portion 72 and the reforming-side introduction passage portion 76 to the lower corner between the reforming-side introduction passage portion 72 and the reforming-side introduction passage portion 76, and extends from the upper corner between the reforming-side discharge passage portion 74 and the reforming-side discharge passage portion 78 to the lower corner between the reforming-side discharge passage portion 74 and the reforming-side discharge passage portion 78. The diagonal The diagonal partition join portion 132 partitions the inner heat-insulation layer 140 into a first inner heat-insulation layer 140A and a second inner heat-insulation layer 140B.

The other portions of the configuration of the heat-exchange reformer 120 according to the second embodiment are the same as those of the configuration of the heat-exchange reformer 10.

Accordingly, in the heat-exchange reformer 120 according to the second embodiment, the same effects are obtained as in the heat-exchange reformer 10 according to the first embodiment. Also, in the heat-exchange reformer 120, the heat-insulation layer 112 is partitioned into a plurality of heat-insulation layers (the first inner heat-insulation layer 140A, the second inner heat-insulation layer 140B, and the four outer heat-insulation layers 142). Therefore, if the degree of vacuum in one of the heat-insulation layers decreases, a convection flow (for example, the convection flow of air that enters the one of the heat-insulation layers) does not occur in the entire heat-insulation layer 112. Thus, a sufficient level of heat-insulation performance is maintained. That is, for example, if the degree of vacuum in one of the outer heat-insulation layers 142 decreases, a sufficient degree of vacuum is maintained in the inner heat-insulation layer 140 and the other outer heat-insulation layers 142. Thus, it is possible to maintain a sufficient level of heat-insulation performance in the entire heat-exchange reformer 120.

Also, in the heat-exchange reformer 120, the stacked core 50 is supported by the partition join portion 122 such that the stacked core 50 does not contact the case 52. Therefore, deformation of the stacked core 50 is permitted in the case 52, and concentration of stress is suppressed. In the heat-exchange reformer 120, the partition join portion 122 functions as a reinforcement rib. This improves the rigidity of the entire heat-exchange reformer 120. Particularly in the heat-exchange reformer 120 that is a cross-flow heat-exchanger, the heat-exchange reforming portion 70 (heat-exchange passage formation portions 58A) are likely to twist or bend due to heat deformation. However, because the diagonal partition join portion 132, which is formed along the diagonal line, functions as a reinforced beam, it is possible to effectively suppress the stacked core 50 (particularly the heat-exchange reforming portion 70) from twisting or bending. Thus, a gas leak from the heat-exchange reforming portion 70 is effectively prevented.

Figure 8:
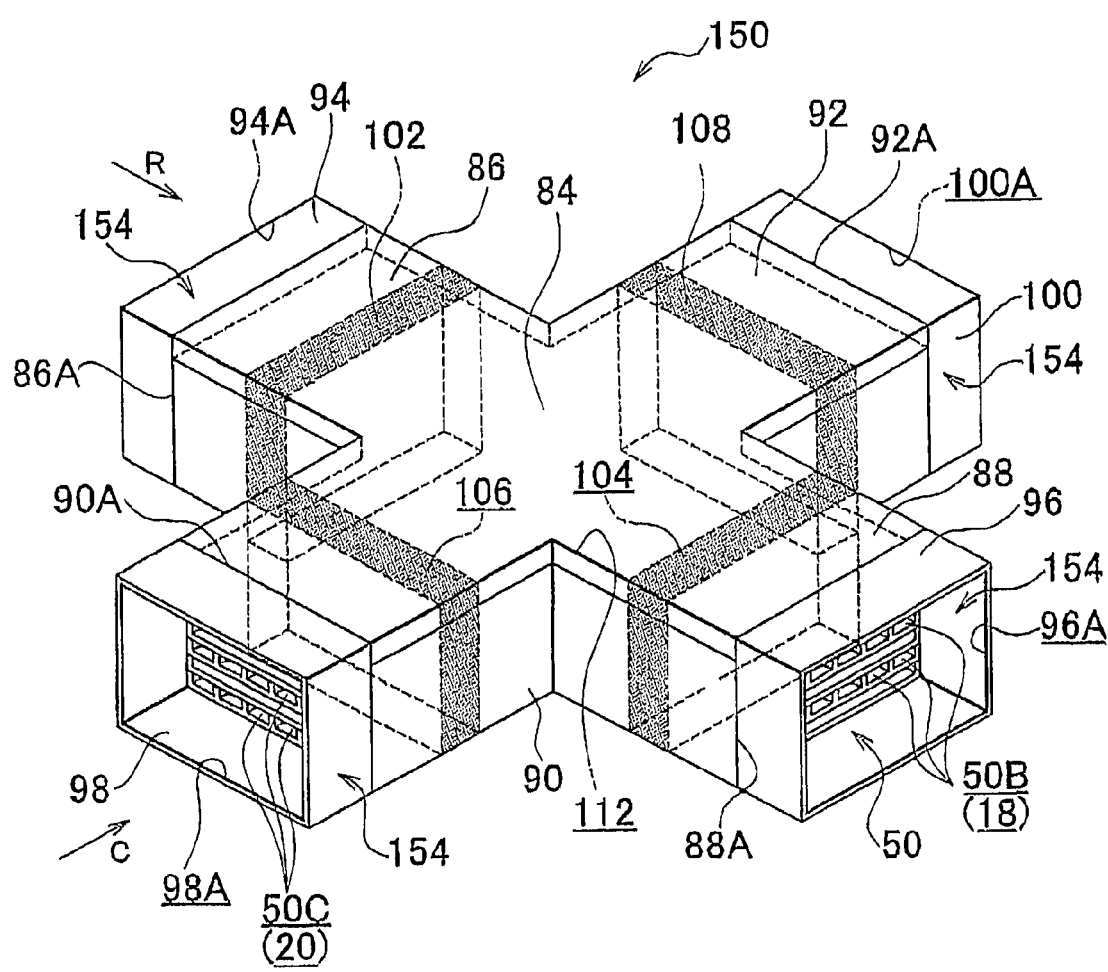
FIG. 8 is a perspective view showing the entire configuration of a heat-exchange reformer according to a third embodiment of the invention.

A third embodiment of the invention will be described FIG. 8 shows a heat-exchange reformer 150 according to the embodiment. As shown in FIG. 8, the heat-exchange reformer 150 differs from the heat-exchange reformer 10 according to the first embodiment, in that the heat-exchange reformer 150 includes a case 152 in which the manifolds 94, 96, 98, and 102 are not formed, instead of the case 52, and the manifolds 94, 96, 98, and 102 are formed by joining manifold members 154, which are separate members, to the case 152.

In the case 152, the upstream end 86A of the reforming inlet manifold connection portion 86, the downstream end 88A of the reforming outlet manifold connection portion 88, the upstream end 90A of the combustion inlet manifold connection portion 90, and the downstream end 92A of the combustion outlet manifold connection portion 92 are join portions that are joined to the respective manifold members 154. Each manifold member 154 has a rectangular-annular shape in accordance with the shape of the peripheral edge of each join portion. The manifold members 154 are joined to the respective end surfaces of the upstream ends 86A and 90A, and the downstream ends 88A and 92A by brazing. Thus, the manifolds 94, 96, 98, and 102 are formed.

The other portions of the configuration of the heat-exchange reformer 150 according to the third embodiment are the same as those of the configuration of the heat-exchange reformer 10.

Accordingly, in the heat-exchange reformer 150 according to the third embodiment, the same effects are obtained as in the heat-exchange reformer 10 according to the first embodiment. In the heat-exchange reformer 150, the manifolds 94, 96, 98, and 102 are formed by joining the manifold members 154, which are separate members, to the case 152. Therefore, there is much flexibility in the design. That is, no restriction is placed on the design of each of the manifolds 94, 96, 98, and 102 by the size and shape of the case 152. Although the open ends 94A, 96A, 98A, and 100A have a rectangular shape in this embodiment, the open ends may have shapes in accordance with, for example, the shapes of the respective lines connected to the open ends (i.e., the shapes of the raw-material supply line 28, the reformed-gas supply line 30, the anode off-gas line 32, the exhaust-gas line 34, the steam supply line 40, and the combustion-enhancing-gas supply line 46).

Also, in the heat-exchange reformer 150, the case 152, which does not contact the stacked core 50, is connected to the manifold members 154. This suppresses heat transfer via the join portions joined to the manifold members 154. As a result, it is possible to reduce heat loss due to heat transfer from the stacked core 50 via connection elements such as the case 152, the manifolds 94, 96, 98, and 102, and the pipes (i.e., heat loss caused in the longest passage through which heat is transferred), even as compared to the configuration in which the case 52 integrally provided with the manifold 94, 96, 98, and 102 is used.

In each of the above-described embodiments, the stacked core 50 is formed by joining the unit plate members 54 and 56 by brazing. However, the invention is not limited to this configuration. For example, the stacked unit plate members 54 and 56 may be joined together by diffusion bonding.

In each of the above-described embodiments, the cross-flow heat-exchange reforming portion is formed in the stacked core 50. However, the invention is not limited to this configuration. For example, the passage formation portions 58B to 58E may be bent in different directions with respect to the heat-exchange passage formation portion 58A so that the heat-exchange formation portion 70 formed by stacking the heat-exchange passage formation portions 58A is a parallel-flow heat-exchange portion. Also, in each of the above-described embodiments, the unit plate members 54 and 56 are alternately stacked (i.e., the reforming passages 18 and the heating passages 20 are alternately formed). However, the invention is not limited to the configuration. For example, a set of unit plate members may be formed by sandwiching one unit plate member 54 between two unit plate members 56, and the sets of unit plate members may be stacked (that is, the unit plate members 54 and 56 may be stacked such that the two layers of heat passages 20 are formed between the reforming passages 18).

In each of the above-described embodiments, each of the cases 52 and 152 is formed by joining the cover 82 to the case body 80. However, the invention is not limited to the configuration. For example, the case 52 or 152 may be formed by joining upper and lower halves of the case 52 or 152 that are symmetrical to each other.

Further, each of the heat-exchange reformers 10, 120, and 150 is used in the fuel cell system 11. However, the invention is not limited to this configuration. The structure of each of the heat-exchange reformers 10, 120, and 150 may be used for any purpose. For example, each of the heat-exchange reformers 10, 120, and 150 may supply hydrogen to a hydrogen engine (internal combustion engine). Alternatively, in each of the heat-exchange reformers 10, 120, and 150, fuel may be supplied to the heating passages 20 from the outside of the system.

While the invention has been described with reference to exemplary embodiments thereof, it should be understood that the invention is not limited to the exemplary embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A heat exchanger comprising:
a stacked core including a stacked plurality of unit members in each of which a first inlet passage formation portion, a first outlet passage formation portion, a second inlet passage formation portion, and a second outlet passage formation portion are independent of each other and extend from a heat-exchange passage formation portion along a plane, wherein the stacked core includes a plurality of heat-exchange portions in each of which a first heat-exchange passage and a second heat-exchange passage are adjacent to each other via the heat-exchange passage formation portion, the first heat-exchange passage being configured to flow a first heat-exchange medium through the first heat-exchange passage from the first inlet passage formation portion to the first outlet passage formation portion, and the second heat-exchange passage being configured to flow a second heat-exchange medium through the second heat-exchange passage from the second inlet passage formation portion to the second outlet passage formation portion;
a case including a shape in accordance with an outer shape of the stacked core, and which houses the stacked core such that the first heat-exchange medium and the second heat-exchange medium flow into and flow out of the stacked core; and
a layer formation seal provided between an inner surface of the case and an outer surface of the stacked core, and which forms a heat-insulation layer between the case and the stacked core, wherein the heat-insulation layer is a closed space separated from an outside, and an entirety of the stacked core that is inside the closed space does not conductively contact the case;
wherein
the layer formation seal seals an area between the case and an entire periphery of a stacked portion of the first inlet passage formation portions in the stacked core, along a plane crossing a direction in which the first heat-exchange medium flows, and an area between the case and an entire periphery of a stacked portion of the first outlet passage formation portions in the stacked core, along the plane crossing the direction in which the first heat-exchange medium flows, and
the layer formation seal seals an area between the case and an entire periphery of a stacked portion of the second inlet passage formation portions in the stacked core, along a plane crossing a direction in which the second heat-exchange medium flows, and an area between the case and an entire periphery of a stacked portion of the second outlet passage formation portions in the stacked core, along the plane crossing the direction in which the second heat-exchange medium flows.

2. The heat exchanger according to claim 1, wherein the heat-insulation layer is a vacuum layer.

3. The heat exchanger according to claim 1, wherein the layer formation seal includes a join portion that mechanically joins the case to the stacked core.

4. The heat exchanger according to claim 3, further comprising:
a partition seal provided between an inner surface of the case and an outer surface of the stacked core, and which partitions the heat-insulation layer into a plurality of closed spaces.

5. The heat exchanger according to claim 4, wherein the partition seal includes a join portion that mechanically joins the case to the stacked core.

6. The heat exchanger according to claim 5, wherein at least a part of the join portion is disposed to have a reinforcement function that suppresses heat deformation of the stacked core.

7. The heat exchanger according to claim 1, wherein
manifold portions are provided in portions of the case, which house the stacked portion of the first inlet passage formation portions, the stacked portion of the first outlet passage formation portions, the stacked portion of the second inlet passage formation portions, and the stacked portion of the second outlet passage formation portions in the stacked core, respectively, and
the manifold portions form spaces that communicate with open portions of the first inlet passage formation portions, open portions of the first outlet passage formation portions, open portions of the second inlet passage formation portions, and open portions of the second outlet passage formation portions, respectively.

8. A heat-exchange reformer in which the heat exchanger according to claim 1 is used, wherein
the first heat-exchange passage is a reforming passage in which a reforming reaction is caused to generate hydrogen-containing gas using a reforming raw material introduced through the first inlet passage formation portion, and
the second heat-exchange passage is a heating passage in which fuel supplied through the second inlet passage formation portion is burned to supply heat to the reforming passage so that the reforming reaction proceeds.

9. The heat exchanger according to claim 1 wherein the layer formation seal provided between an inner surface of the case and an outer surface of the stacked core is a brazed joint.

10. The heat exchanger according to claim 7, wherein the manifold portions do not contact the stacked core.

* * * * *